United States Patent
Zhou et al.

(10) Patent No.: US 9,211,494 B2
(45) Date of Patent: Dec. 15, 2015

(54) PROCESS FOR FLOATING LIQUIFIED NATURAL GAS PRETREATMENT

(71) Applicant: UOP LLC, Des Plaines, IL (US)

(72) Inventors: Lubo Zhou, Inverness, IL (US); Shain Doong, Kildeer, IL (US); Mark Schott, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 325 days.

(21) Appl. No.: 13/766,958

(22) Filed: Feb. 14, 2013

(65) Prior Publication Data

US 2014/0224118 A1    Aug. 14, 2014

(51) Int. Cl.
   *B01D 53/04*   (2006.01)
   *B01D 53/14*   (2006.01)
   *C10L 3/10*    (2006.01)

(52) U.S. Cl.
   CPC ........ *B01D 53/0462* (2013.01); *B01D 53/1462* (2013.01); *C10L 3/103* (2013.01); *C10L 3/104* (2013.01); *C10L 3/106* (2013.01); *B01D 2252/204* (2013.01); *B01D 2253/104* (2013.01); *B01D 2253/106* (2013.01); *B01D 2253/108* (2013.01); *B01D 2256/245* (2013.01); *B01D 2257/30* (2013.01); *B01D 2257/504* (2013.01); *B01D 2257/80* (2013.01); *C10L 2290/541* (2013.01); *C10L 2290/542* (2013.01); *C10L 2290/567* (2013.01); *C10L 2290/60* (2013.01); *Y02C 10/08* (2013.01)

(58) Field of Classification Search
   CPC ........... B01D 2252/00; B01D 2252/10; B01D 2252/20; B01D 2252/202; B01D 2252/205; B01D 2252/204; B01D 2253/104; B01D 2253/102; B01D 2253/106; B01D 2253/112; B01D 2253/116; C10L 2290/541; C10L 2290/542; C10L 2290/567; C10L 2290/60; C10L 3/103; C10L 3/104; C10L 3/106; Y02C 10/08

See application file for complete search history.

(56) References Cited

U.S. PATENT DOCUMENTS

| | | | |
|---|---|---|---|
| 6,251,165 | B1 | 6/2001 | Jullian et al. |
| 7,025,801 | B2 | 4/2006 | Monereau |

(Continued)

FOREIGN PATENT DOCUMENTS

| | | |
|---|---|---|
| RU | 2465040 C2 | 10/2012 |
| WO | WO 2009/126607 A2 | 10/2009 |

(Continued)

OTHER PUBLICATIONS

Search Report dated Jun. 10, 2014 for corresponding PCT Appl. No. PCT/US2014/014578.

*Primary Examiner* — Duane Smith
*Assistant Examiner* — Cabrena Holecek

(57) ABSTRACT

A method of pretreating a natural gas stream for a floating liquefied natural gas plant is described. A natural gas feed stream is introduced into an amine absorption unit and a temperature swing adsorption unit located on a ship. The temperature swing adsorption unit has a dehydration cycle and a $CO_2$ removal cycle. The amount of motion of the ship, or the level of $CO_2$ in the natural gas feed stream with reduced contaminants, or both, is monitored. If the amount of motion of the ship or the level of $CO_2$ in the natural gas feed stream with reduced contaminants exceeds a predetermined value, temperature swing adsorption unit is switched from the dehydration cycle to the $CO_2$ removal cycle.

20 Claims, 4 Drawing Sheets

(56) References Cited

U.S. PATENT DOCUMENTS

| | | |
|---|---|---|
| 7,255,727 B2 | 8/2007 | Monereau et al. |
| 7,803,215 B2 | 9/2010 | Russell et al. |
| 2009/0259323 A1 | 10/2009 | Kesavan et al. |
| 2011/0290110 A1* | 12/2011 | Zhou et al. ................ 95/45 |
| 2011/0315010 A1* | 12/2011 | Doong et al. ................ 95/46 |

FOREIGN PATENT DOCUMENTS

| | | |
|---|---|---|
| WO | 2011149660 A3 | 12/2011 |
| WO | 2011163297 A2 | 12/2011 |

* cited by examiner

PROCESS FOR FLOATING LIQUIFIED NATURAL GAS PRETREATMENT

FIELD OF THE INVENTION

The present invention relates to a combined absorption and adsorption process to treat natural gas prior to liquefaction in a floating environment such as a ship. More specifically, it relates to improvement of the removal of contaminants in an absorber where the liquid is poorly distributed due to the natural rolling, listing and movement of a ship at sea.

BACKGROUND OF THE INVENTION

Natural gas is widely used in industrial and residential applications. Transportation of gas is more difficult than liquid transportation. When natural gas fields are relatively close to the users, the gas is usually transported by pipeline. In other cases where gas fields are remotely located and/or the users are far away from the fields, the natural gas is first liquefied, and then transported in the form of liquefied natural gas (LNG).

In a LNG plant, contaminants, such as carbon dioxide and hydrogen sulfide, have to be reduced to very low levels. For example, the carbon dioxide content in the feed gas stream must be less than 50 ppmv before liquefaction to avoid formation of dry ice within the system. Commercially, this can be achieved by using a solvent absorption process, such as contacting the natural gas with an amine solvent, such as monoethanol amine (MEA) or diethanol amine (DEA) for example, to remove the carbon dioxide. The amine is regenerated after use. Other $CO_2$ removal processes are known in the art, such as cryogenic processes, adsorption processes such as pressure swing adsorption (PSA) and thermal swing adsorption (TSA), and membrane-based processes.

The contaminant removal is followed by the natural gas being sent through a molecular sieve dehydration unit to remove water to below 1 ppmv.

In recent years, there has been increasing interest in developing floating LNG (FLNG) facilities that can liquefy the offshore gas for transportation. A floating LNG facility can be positioned adjacent to an offshore natural gas well to liquefy the gas as it is being loaded on a tanker, which eliminates the need for pipelines to take the gas onshore prior to liquefaction in a conventional facility. The floating LNG facility could be moved from one port to another to service small LNG fields, as needed.

However, the processing of natural gas on such a vessel entails problems not encountered by land-based facilities. The movement of the ship can result in poor distribution of liquid in a separation column. The mass transfer efficiency of the gas-liquid phase inside the column will be significantly reduced due to the poor distribution. In FLNG pretreatment, an amine absorber and regenerator are used to remove acid gas. If the column efficiency is reduced, the treated gas from the amine absorber may not be able to meet the low acid gas specification (e.g., less than 50 ppm $CO_2$), which will generate a plugging problem of the downstream liquefaction system.

Therefore, there is a need for a reliable process that can ensure that the treated gas meets the LNG feed specification.

SUMMARY OF THE INVENTION

One aspect of the invention is a method of pretreating a natural gas stream for a floating liquefied natural gas plant. In one embodiment, the method includes introducing a natural gas feed stream into an amine absorption unit located on a ship to reduce a level of sulfur, $CO_2$, or both to form a natural gas feed stream with reduced contaminants. The natural gas feed stream with reduced contaminants is introduced into a temperature swing adsorption unit located on the ship to reduce a level of $H_2O$, $CO_2$, or both. The temperature swing adsorption unit has a dehydration cycle and a $CO_2$ removal cycle. The amount of motion of the ship, or the level of $CO_2$ in the natural gas feed stream with reduced contaminants, or both is monitored. If the amount of motion of the ship or the level of $CO_2$ in the natural gas feed stream with reduced contaminants is less than or equal to a predetermined value, the temperature swing adsorption unit is operated in the dehydration cycle. If the amount of motion of the ship or the level of $CO_2$ in the natural gas feed stream with reduced contaminants is greater than the predetermined value, the CO2 removal cycle is initiated.

In some embodiments, after at least one $CO_2$ removal cycle, when the amount of motion of the ship or the level of $CO_2$ in the reduced sulfur natural gas stream falls to less than or equal to the predetermined value, the dehydration cycle is initiated.

DETAILED DESCRIPTION OF THE INVENTION

The present invention relates to a process for pretreating the LNG feed in a FLNG facility. The process utilizes conventional amine technology to remove the acid gas from natural gas followed by a thermal swing adsorption (TSA) process for the removal of water when the movement of the FLNG vessel or the level of $CO_2$ is below a predetermined limit. If the FLNG vessel movement and/or the level of $CO_2$ is above the predetermined limit, the TSA system is used to remove the acid gas slipped from the amine process. The invention provides a reliable process for FLNG pretreatment to deliver a treated natural gas that can meet the LNG feed specification.

Figure 1:
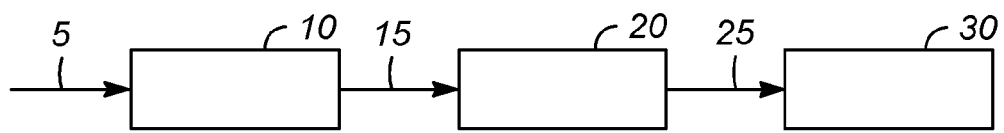
FIG. 1 is an illustration of a prior art system for pretreating LNG feed.

FIG. 1 shows treatment of a natural gas feed 5 in an amine absorption unit 10. The effluent 15 from the amine adsorption unit 10 is sent to the TSA unit 20. The effluent 25 from the TSA unit 20 is sent to the liquefaction unit 30. The amine adsorption unit 10 removes sulfur, and/or $CO_2$ from the natural gas feed stream. The amine adsorption unit 10 generally includes an absorber and a regenerator. As would be understood by those of skill in the art, the number of amine absorption/regeneration columns can vary depending on gas flow rate and/or $CO_2$ content in the feed stream. The TSA unit 20 removes water from the natural gas stream. The number of TSA columns can vary depending on gas flow rate and/or TSA cycles used, as is known by those of skill in the art.

The same adsorbent can be used in the TSA unit for both dehydration and $CO_2$ removal, although the adsorption capacity for $CO_2$ is much lower than for water. Therefore, the cycle time for $CO_2$ removal is typically shorter than for dehydration. The feed time or adsorption time per bed for the dehydration cycle is generally longer than that for $CO_2$ removal. In addition, due to the higher heat of adsorption of water compared to $CO_2$, the heat regeneration time for dehydration is also generally longer than for $CO_2$ removal. For the same bed size, the cooling time will typically be close for both cycles.

If the dehydration TSA and $CO_2$ removal TSA are designed to handle the same amount of feed gas, one additional adsorber is needed for the $CO_2$ removal TSA.

For a FLNG application, this additional adsorber can be used to reduce the $CO_2$ level caused by $CO_2$ slip ($CO_2$>50 ppm) from the amine unit due to sea motion.

The dehydration TSA cycle includes a heating step, a cooling step, and an idle step. During the heating step, at least one first bed is fed with at least a portion of the natural gas feed stream with reduced contaminants, a second bed is heated, and a third bed is idle. In the cooling step, the at least one first bed is fed with at least the portion of the natural gas feed stream with reduced contaminants, the second bed is cooled, and the third bed is idle. In the idle step, the at least one first bed is fed with at least the portion of the natural gas feed stream with reduced contaminants, and the second and third beds are idle.

In the $CO_2$ removal cycle, the at least one first bed is fed at least the portion of the natural gas feed stream with reduced contaminants, the second bed is cooled, and the third bed is heated.

The dehydration and $CO_2$ removal cycles are repeated in order to regenerate each bed.

The motion of the ship, or the level of $CO_2$ in the natural gas feed stream with reduced contaminants, or both is monitored. The motion of the ship is monitored for pitch (front to back) and/or roll (side to side motion). Suitable monitors for the motion of the ship include, but are not limited to, accelerometers, and gyroscopes. Suitable monitors for the level of $CO_2$ include, but are not limited to, $CO_2$ sensors, and gas chromatographs.

If the motion or the level of $CO_2$ (or both) is greater than a predetermined value, the dehydration cycle is ended, and the $CO_2$ removal cycle is initiated. When the motion or the level of $CO_2$ falls to less than or equal to the predetermined value, the system switches back to the dehydration cycle.

When the motion or level of $CO_2$ is greater than the predetermined value, the system determines what step the TSA unit is in: heating, cooling, or idle. If the TSA unit is in the heating step, a transition step is initiated in which the second bed continues heating until the heating step is completed. During the transition step, the at least one first bed and the third bed are fed equally with the natural gas feed stream with reduced contaminants. When the heating step is completed, the $CO_2$ removal cycle is initiated.

If the TSA unit is in the cooling or idle step, the $CO_2$ removal cycle is initiated.

The predetermined value for the $CO_2$ level will typically be about 50 ppm to prevent formation of dry ice during the liquefaction process, although it could be higher or lower depending on the system and conditions required for the liquefaction process.

The predetermined value for the motion of the ship is a level of motion that causes poor distribution of the liquid in the amine column and/or the regeneration column. It will typically be 1 degree for a permanent tilt (list and/or trim), and 2.5 to 4 degrees for angular motion (pitch and/or roll).

Suitable adsorbents for the TSA unit include, but are not limited to, molecular sieves, alumina, silica gel, mixed oxide adsorbents, or combinations thereof. In some embodiments, the adsorbent is a molecular sieve. Suitable molecular sieves include, but are not limited to, zeolite X, zeolite A, zeolite Y, or combinations thereof.

If there are three beds in the TSA unit, there is one first bed, and the entire natural gas stream with reduced contaminants is fed to it. If there are four (or more) beds, there are two (or more) first beds, and the natural gas stream with reduced contaminants is fed to the two (or more) beds equally.

Figure 2C:
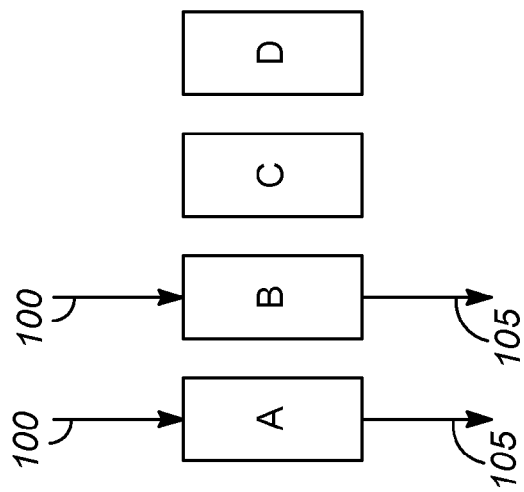
FIGS. 2A-C are illustrations of one embodiment of a dehydration cycle using four adsorbers in a thermal swing adsorption process.
Figure 2B:
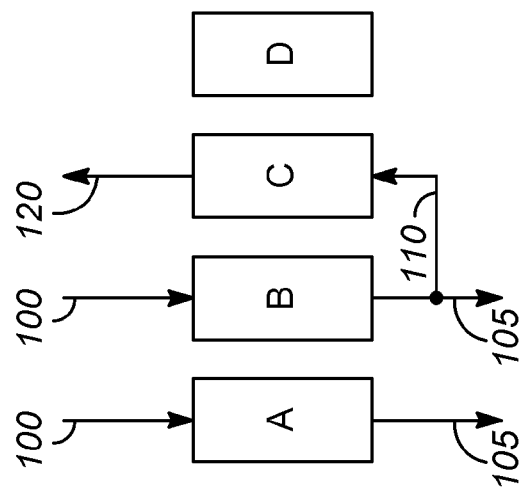
Figure 2A:
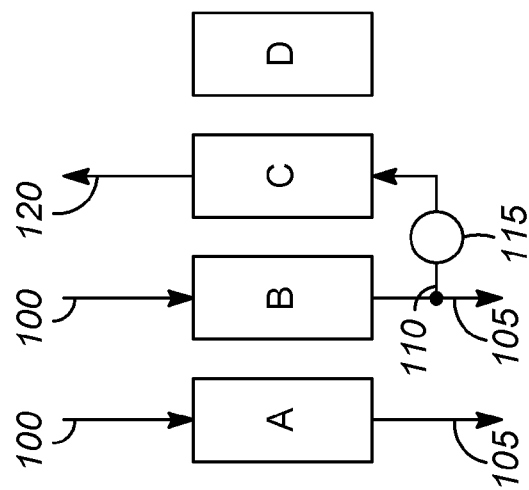

FIGS. 2A-C illustrate the operation of one embodiment of the dehydration cycle of the TSA unit with four adsorbers A, B, C, D. In this example, bed C is being regenerated, and bed A is the next bed to be regenerated.

When the amine unit generates a product stream meeting the $CO_2$ specification, adsorber D is idled throughout the dehydration cycle.

The heating step having a time of T1 is shown in FIG. 2A. Feed 100 is introduced into adsorbers A and B where water is removed. Product 105 exits adsorbers A and B. A portion 110 of product 105 from adsorber B is sent to heater 115 before being introduced into adsorber C to regenerate the bed. The effluent 120 from adsorber C is sent to an aftercooler (not shown).

The cooling step having a time of T2 is shown in FIG. 2B. Feed 100 is still being introduced into adsorbers A and B with product 105 exiting adsorbers A and B. A portion 110 of the product 105 from adsorber B is introduced into adsorber C to cool the bed.

The idle step having a time of T3 is shown in FIG. 2C. Feed 100 is still being introduced into adsorbers A and B with product 105 exiting adsorbers A and B. Adsorber C is idle as no product is being sent to it.

The cycle sequence for the dehydration cycle when the amine unit generates a product stream meeting the $CO_2$ specification is shown Table 1.

TABLE 1

| | Time | | | | | |
|---|---|---|---|---|---|---|
| | T1 | T2 | T3 | T1 | T2 | T3 |
| A | Feed | Feed | Feed | Heat | Cool | Idle |
| B | Feed | Feed | Feed | Feed | Feed | Feed |
| C | Heat | Cool | Idle | Feed | Feed | Feed |
| D | Idle | Idle | Idle | Idle | Idle | Idle |

However, if there is severe sea motion or a level of $CO_2$ higher than 50 ppm has been detected from the amine unit, the cycle sequence will be switched from the dehydration cycle to the $CO_2$ removal cycle. A four bed $CO_2$ removal cycle sequence is illustrated in FIGS. 3A-D. Each of the steps of the $CO_2$ removal cycle includes one bed being fed, one bed being heated, and one bed being cooled. The steps of the $CO_2$ removal cycle are the same length.

Figure 3B:
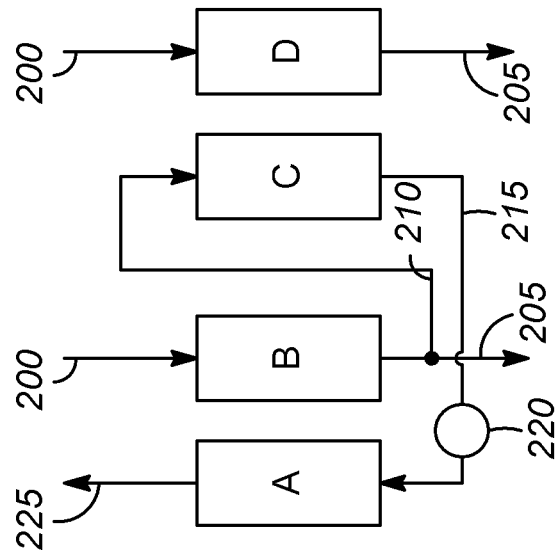
FIGS. 3A-D are illustrations of one embodiment of a $CO_2$ removal cycle using four adsorbers in a thermal swing adsorption process.
Figure 3A:
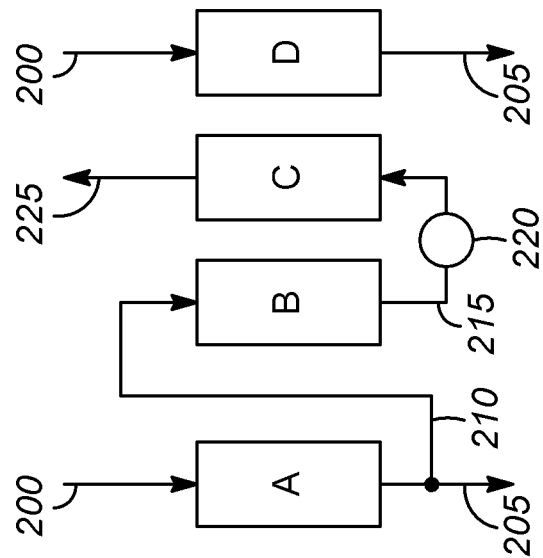

FIG. 3A shows the regeneration of adsorber C. Feed 200 is introduced into adsorbers A and D where the $CO_2$ is removed. Product 205 exits adsorbers A and D. A portion 210 of product 205 from adsorber A is sent to adsorber B for cooling. The effluent 215 from adsorber B is heated in heater 220 and sent to adsorber C to regenerate the bed. The effluent 225 from bed C is sent to an aftercooler (not shown).

FIG. 3B shows the regeneration of adsorber A. Feed 200 is introduced into adsorbers B and D where the $CO_2$ is removed. Product 205 exits adsorbers B and D. A portion 210 of product 205 from adsorber B is sent to adsorber C for cooling. The effluent 215 from adsorber C is heated in heater 220 and sent to adsorber A to regenerate the bed. The effluent 225 from bed A is sent to an aftercooler (not shown).

Figure 3D:
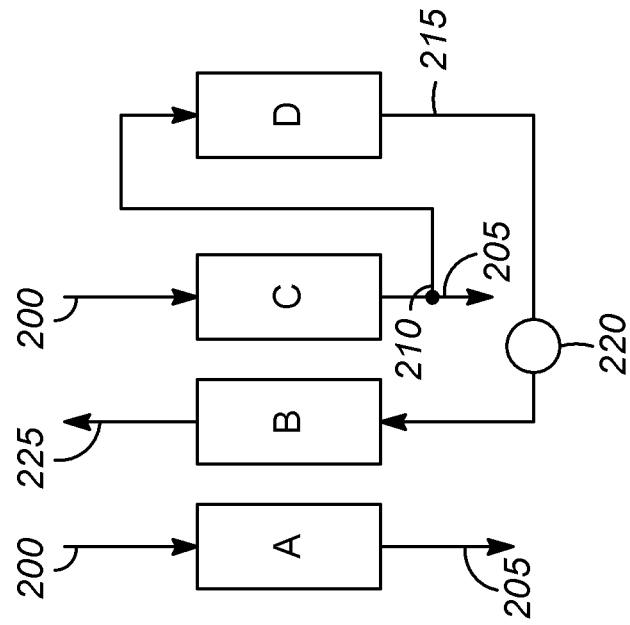
Figure 3C:
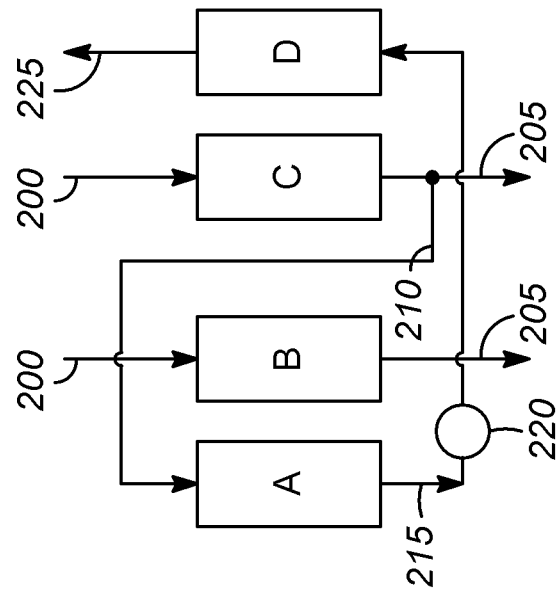

FIG. 3C shows the regeneration of adsorber D. Feed 200 is introduced into adsorbers B and C where the $CO_2$ is removed. Product 205 exits adsorbers B and C. A portion 210 of product 205 from adsorber C is sent to adsorber A for cooling. The effluent 215 from adsorber A is heated in heater 220 and sent to adsorber D to regenerate the bed. The effluent 225 from bed D is sent to an aftercooler (not shown).

FIG. 3D shows the regeneration of adsorber B. Feed 200 is introduced into adsorbers A and C where the $CO_2$ is removed. Product 205 exits adsorbers A and C. A portion 210 of product 205 from adsorber C is sent to adsorber D for cooling. The effluent 215 from adsorber D is heated in heater 220 and sent to adsorber B to regenerate the bed. The effluent 225 from bed B is sent to an aftercooler (not shown).

The cycle sequence for a typical four bed $CO_2$ removal TSA operation is shown in Table 2.

TABLE 2

| | Time | | | |
|---|---|---|---|---|
| | T4 | T4 | T4 | T4 |
| A | Feed | Heat | Cool | Feed |
| B | Cool | Feed | Feed | Heat |
| C | Heat | Cool | Feed | Feed |
| D | Feed | Feed | Heat | Cool |

The transition from the dehydration cycle to the $CO_2$ removal cycle depends on when the off-specification amine product is detected or when the sea motion above the designed condition is measured. Let Tx designate this time instant. There are 4 scenarios depending on Tx:

$$0 < Tx < T4 \qquad 1)$$

T4 is the step time for the $CO_2$ removal TSA cycle as shown previously. Both Bed A and B undergo the feed step and Bed C is being regenerated. Bed A is the next adsorber to be regenerated after the end of this cycle. When the off-spec amine product is detected at Tx, no action is taken until T4 (i.e., after T4-Tx has elapsed). At time T4, the feed gas is sent to adsorbers A, B and D with each receiving ⅓ of the total feed flow, or ⅔ of the original feed flow per bed. This continues until bed C finishes the heat regeneration step. Then, the $CO_2$ removal cycle is initiated with bed C starts the cooling step, while bed A begins the heat regeneration step, and beds B and D continue receiving the feed. The subsequent steps will follow the $CO_2$ removal TSA cycle shown above. The regeneration off-gas is recycled back to the inlet of the amine unit after it is cooled down and the water is condensed.

Table 3 shows the cycle sequence for this situation.

TABLE 3

| | Time | | | | | |
|---|---|---|---|---|---|---|
| | | Tx ↓ | T4 ↓ | T1 ↓ | | |
| | T0 | T4 - Tx | T1 - T4 | T4 | T4 | T4 |
| A | Feed | Feed | 2/3 Feed | Heat | Cool | Feed |
| B | Feed | Feed | 2/3 Feed | Feed | Heat | Cool |
| C | Heat | Heat | Heat | Cool | Feed | Feed |
| D | Idle | Idle | 2/3 Feed | Feed | Feed | Heat |

$$T4 < Tx < T1 \qquad 2)$$

If Tx occurs later than the above case, but before bed C finishes the heating step, the feed gas is immediately sent to beds A, B and D with each receiving ⅓ of the total feed flow, or ⅔ of the original feed flow per bed. This continues until bed C finishes heat regeneration step at T1. Then, the $CO_2$ removal cycle is initiated with bed C starts the cooling step, while bed A begins the heat regeneration step, and beds B and D continue receiving the feed. Subsequently, the $CO_2$ removal TSA sequence be followed.

This is shown in Table 4.

TABLE 4

| | Time | | | | | |
|---|---|---|---|---|---|---|
| | | Tx ↓ | T1 ↓ | | | |
| | T0 | T1 - Tx | T4 | T4 | T4 | T4 |
| A | Feed | 2/3 Feed | Heat | Cool | Feed | Feed |
| B | Feed | 2/3 Feed | Feed | Heat | Cool | Feed |
| C | Heat | Heat | Cool | Feed | Feed | Heat |
| D | Idle | 2/3 Feed | Feed | Feed | Heat | Cool |

$$T1 < Tx < T2 \qquad 3)$$

If Tx occurs after bed C has completed the heat regeneration step and is being cooled, the cycle switches to the $CO_2$ removal cycle with bed A being regenerated, bed C continuing the cooling step, and beds B and D receiving the feed, as shown in Table 5. The $CO_2$ removal cycle will then be followed.

TABLE 5

| | Time | | | | | |
|---|---|---|---|---|---|---|
| | | | T1 ↓ | Tx ↓ | Tx + T4 ↓ | |
| Time | T0 | T1 | Tx - T1 | T4 | T4 | T4 |
| A | Feed | Feed | Feed | Heat | Cool | Feed |
| B | Feed | Feed | Feed | Feed | Heat | Cool |
| C | Heat | Heat | Cool | Cool | Feed | Feed |
| D | Idle | Idle | Idle | Feed | Feed | Heat |

$$T2 < Tx < T3 \qquad 4)$$

If Tx occurs after bed C has completed the cool regeneration step and is being idled, the cycle switches to the $CO_2$ removal cycle with bed C receiving the feed gas along with bed B, bed A beginning the heat regeneration step, and bed D continuing to be idled. The $CO_2$ removal cycle will then be followed.

| | Time | | | | | |
|---|---|---|---|---|---|---|
| | | | | | Tx ↓ | Tx + T4 ↓ |
| Time | T0 | T1 | T2 | Tx - T2 | T4 | T4 |
| A | Feed | Feed | Feed | Feed | Heat | Cool |
| B | Feed | Feed | Feed | Feed | Feed | Heat |
| C | Heat | Heat | Cool | Idle | Feed | Feed |
| D | Idle | Idle | Idle | Idle | Idle | Feed |

Example

A 4-bed TSA dehydration unit placed after an amine unit in a FLNG is designed to process 1.19e5 $Nm^3$/hr feed gas at 5980 KPa. Only 3 adsorbers are running with the 4th bed idled if the feed gas contains less than 50 ppm $CO_2$. The regeneration flow is 11200 $Nm^3$/hr. The cycle time split is as follows:

T1=2.26 hrs, T2=1.1 hrs and T3=4.64 hrs (T1+T2+T3=8 hrs)

The same 4-bed system can be operated to remove feed gas with a $CO_2$ concentration at 110 ppm down to 50 ppm. The required regeneration flow is 12300 Nm/hr. The unit can process $1.25 \times 10^5$ Nm³/hr feed gas at the same 5980 KPa. The slightly higher feed flow compared to the dehydration case is due to more regeneration flow, which is recycled back to the amine feed. The cycle time for this $CO_2$ removal cycle is T4=1.3 hrs.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of pretreating a natural gas stream for a floating liquefied natural gas plant comprising:
    introducing a natural gas feed stream into an amine absorption unit to reduce a level of sulfur, $CO_2$, or both to form a natural gas feed stream with reduced contaminants, the amine absorption unit being located on a ship;
    introducing the natural gas feed stream with reduced contaminants into a temperature swing adsorption unit to reduce a level of $H_2O$, $CO_2$, or both; the temperature swing adsorption unit being located on the ship; the temperature swing adsorption unit having a dehydration cycle and a $CO_2$ removal cycle;
    monitoring an amount of motion of the ship, or a level of $CO_2$ in the natural gas feed stream with reduced contaminants, or both;
    if the amount of motion of the ship or the level of $CO_2$ in the natural gas feed stream with reduced contaminants is less than or equal to a predetermined value, operating the temperature swing adsorption unit in the dehydration cycle; and
    if the amount of motion of the ship or the level of $CO_2$ in the natural gas feed stream with reduced contaminants is greater than the predetermined value, initiating the $CO_2$ removal cycle.

2. The method of claim 1, further comprising:
    after at least one $CO_2$ removal cycle, when the amount of motion of the ship or the level of $CO_2$ in a reduced sulfur natural gas stream falls to less than or equal to the predetermined value, initiating the dehydration cycle.

3. The method of claim 1 wherein the dehydration cycle comprises a heating step in which at least one first bed is fed with at least a portion of the natural gas feed stream with reduced contaminants, a second bed is heated, and a third bed is idle; a cooling step in which the at least one first bed is fed with at least the portion of the natural gas feed stream with reduced contaminants, the second bed is cooled, and the third bed is idle; and an idle step in which the at least one first bed is fed with at least the portion of the natural gas feed stream with reduced contaminants, and the second and third beds are idle.

4. The method of claim 1 wherein the $CO_2$ removal cycle comprises a first step in which an at least one first bed is fed at least a portion of the natural gas feed stream with reduced contaminants, a second bed is cooled, and a third bed is heated; a second step in which the at least one first bed is heated, the second bed is fed at least the portion of the natural gas feed stream with reduced contaminants, and the third bed is cooled; and a third step in which the at least one first bed is cooled, the second bed is heated, and the third bed is fed at least the portion of the natural gas feed stream with reduced contaminants.

5. The method of claim 1 wherein the amount of motion of the ship is monitored.

6. The method of claim 1 wherein the level of $CO_2$ in the natural gas feed stream with reduced contaminants is monitored.

7. The method of claim 6 wherein the predetermined level of $CO_2$ is 50 ppm.

8. The method of claim 1 wherein an adsorbent in the temperature swing adsorption unit is a molecular sieve, alumina, silica gel, a mixed oxide adsorbent, or combinations thereof.

9. The method of claim 8 wherein the adsorbent is the molecular sieve.

10. The method of claim 9 wherein the molecular sieve comprises zeolite X, zeolite A, zeolite Y, or combinations thereof.

11. The method of claim 1 further comprising introducing a pretreated natural gas feed to a liquefaction unit.

12. The method of claim 3 wherein initiating the $CO_2$ removal cycle comprises;
    determining whether the temperature swing adsorption unit is in the heating step, the cooling step, or the idle step;
    if the temperature swing adsorption unit is in the heating step, initiating a transition step in which the second bed continues heating until the heating step is completed and the at least one first bed and the third bed are fed equally with the natural gas feed stream with reduced contaminants; and initiating the $CO_2$ removal cycle; and
    if the temperature swing adsorption unit is in the cooling step or the idle step, initiating the $CO_2$ removal cycle.

13. The method of claim 12 further comprising waiting for a length of time at least equal to a length of time of one step of the $CO_2$ removal cycle after the heating step is completed before feeding equally the at least one first bed and the third bed.

14. The method of claim 1 wherein the temperature swing adsorption unit includes three beds.

15. The method claim 1 wherein the temperature swing adsorption unit includes four beds.

16. A method of pretreating a natural gas stream for a floating liquefied natural gas plant comprising:
    introducing a natural gas feed stream into an amine absorption unit to reduce a level of sulfur, $CO_2$, or both to form a natural gas feed stream with reduced contaminants, the amine absorption unit being located on a ship;
    introducing the natural gas feed stream with reduced contaminants into a temperature swing adsorption unit to reduce a level of $H_2O$, $CO_2$, or both; the temperature swing adsorption unit being located on the ship; the temperature swing adsorption unit having a dehydration cycle and a $CO_2$ removal cycle; the dehydration cycle having a heating step in which at least one first bed is fed with at least a portion of the natural gas feed stream with reduced contaminants, a second bed is heated, and a third bed is idle; a cooling step in which the at least one first bed is fed with at least the portion of the natural gas feed stream with reduced contaminants, the second bed is cooled, and the third bed is idle; and an idle step in which the at least one first bed is fed with at least the portion of the natural gas feed stream with reduced contaminants, and the second and third beds are idle; the $CO_2$ removal cycle having a first step in which the at least one first bed is fed at least the portion of the natural gas feed stream with reduced contaminants, the second bed is cooled, and the third bed is heated; a second step in which the at least one first bed is heated, the second bed is fed at least the portion of the natural gas feed stream with reduced contaminants, and the third bed is cooled; and a third step in which the at least one first bed is cooled, the second bed is heated, and the third bed is fed at least the portion of the natural gas feed stream with reduced contaminants;

monitoring an amount of motion of the ship, or a level of $CO_2$ in the natural gas feed stream with reduced contaminants, or both; and if the amount of motion of the ship or the level of $CO_2$ in the natural gas feed stream with reduced contaminants is less than or equal to a predetermined value, operating the temperature swing adsorption unit in the dehydration cycle;

if the amount of motion of the ship or the level of $CO_2$ in the natural gas feed stream with reduced contaminants is greater than the predetermined value, determining whether the temperature swing adsorption unit is in the heating step, the cooling step, or the idle step;

if the temperature swing adsorption unit is in the heating step, initiating a transition step in which the second bed continues heating until the heating step is completed and the at least one first bed and the third bed are fed equally with the natural gas feed stream with reduced contaminants and initiating the $CO_2$ removal cycle; and if the temperature swing adsorption unit is in the cooling step or the idle step, initiating the $CO_2$ removal cycle.

17. The method of claim 16, further comprising:

after at least one $CO_2$ removal cycle, when the amount of motion of the ship or the level of $CO_2$ in a reduced sulfur natural gas stream falls to less than or equal to the predetermined value, initiating the dehydration cycle.

18. The method of claim 16 wherein the amount of motion of the ship is monitored.

19. The method of claim 16 wherein the level of $CO_2$ in the natural gas feed stream with reduced contaminants is monitored, and wherein the predetermined level of $CO_2$ is 50 ppm.

20. The method of claim 16 further comprising introducing a pretreated natural gas feed to a liquefaction unit.

\* \* \* \* \*